United States Patent [19]

Asik et al.

[11] Patent Number: 5,758,493
[45] Date of Patent: Jun. 2, 1998

[54] METHOD AND APPARATUS FOR DESULFATING A $NO_x$ TRAP

[75] Inventors: Joseph R. Asik, Bloomfield Hills; Garth M. Meyer, Dearborn, both of Mich.

[73] Assignee: Ford Global Technologies, Inc., Dearborn, Mich.

[21] Appl. No.: 764,185

[22] Filed: Dec. 13, 1996

[51] Int. Cl.$^6$ ............................................. F01N 3/20
[52] U.S. Cl. .................... 60/274; 60/297; 60/302; 123/443
[58] Field of Search .................... 60/282, 297, 299, 60/302, 274; 123/443

[56] References Cited

U.S. PATENT DOCUMENTS

| | | | |
|---|---|---|---|
| 3,696,618 | 10/1972 | Boyd et al. | 60/276 |
| 3,708,980 | 1/1973 | Truxell | 60/274 |
| 3,872,843 | 3/1975 | Steinmuller | 60/302 X |
| 3,927,525 | 12/1975 | Jacobs | 60/301 |
| 4,006,722 | 2/1977 | Hata et al. | 123/443 |
| 4,033,122 | 7/1977 | Masaki et al. | 60/274 |
| 4,036,014 | 7/1977 | Ariga | 60/274 |
| 4,056,931 | 11/1977 | Hata | 60/274 |
| 4,106,448 | 8/1978 | Noguchi et al. | 123/268 |
| 4,215,542 | 8/1980 | Kobayasi et al. | 60/290 |
| 4,261,170 | 4/1981 | Suzuki | 60/302 |
| 4,793,135 | 12/1988 | Obstfelder et al. | 60/274 |
| 5,250,268 | 10/1993 | Geiger | 422/174 |
| 5,388,403 | 2/1995 | Nagami et al. | 60/276 |
| 5,402,641 | 4/1995 | Katoh et al. | 60/285 |
| 5,457,290 | 10/1995 | Sase et al. | 181/258 |
| 5,473,890 | 12/1995 | Takeshima et al. | 60/285 |
| 5,517,820 | 5/1996 | Kuroda et al. | 60/274 |
| 5,657,625 | 8/1997 | Koga et al. | 60/274 |

FOREIGN PATENT DOCUMENTS 2238004  5/1991  United Kingdom .............. 60/302

*Primary Examiner*—Tony M. Argenbright
*Attorney, Agent, or Firm*—Allan J. Lippa; Roger L. May

[57] ABSTRACT

A method and apparatus for desulfating a $NO_x$ trap is proposed wherein half of the engine cylinders are operated at a rich air/fuel ratio and half are operated at a lean A/F during the desulfation process. The two exhaust gas streams, the rich stream and the lean stream, are physically or chemically separated until they enter the $NO_x$ trap. A catalyzed exothermic chemical reaction is then generated in the trap. The resulting temperature increase is sufficient to remove SOX from the trap. During desulfation spark advance is adjusted to minimize event time imbalance.

16 Claims, 4 Drawing Sheets

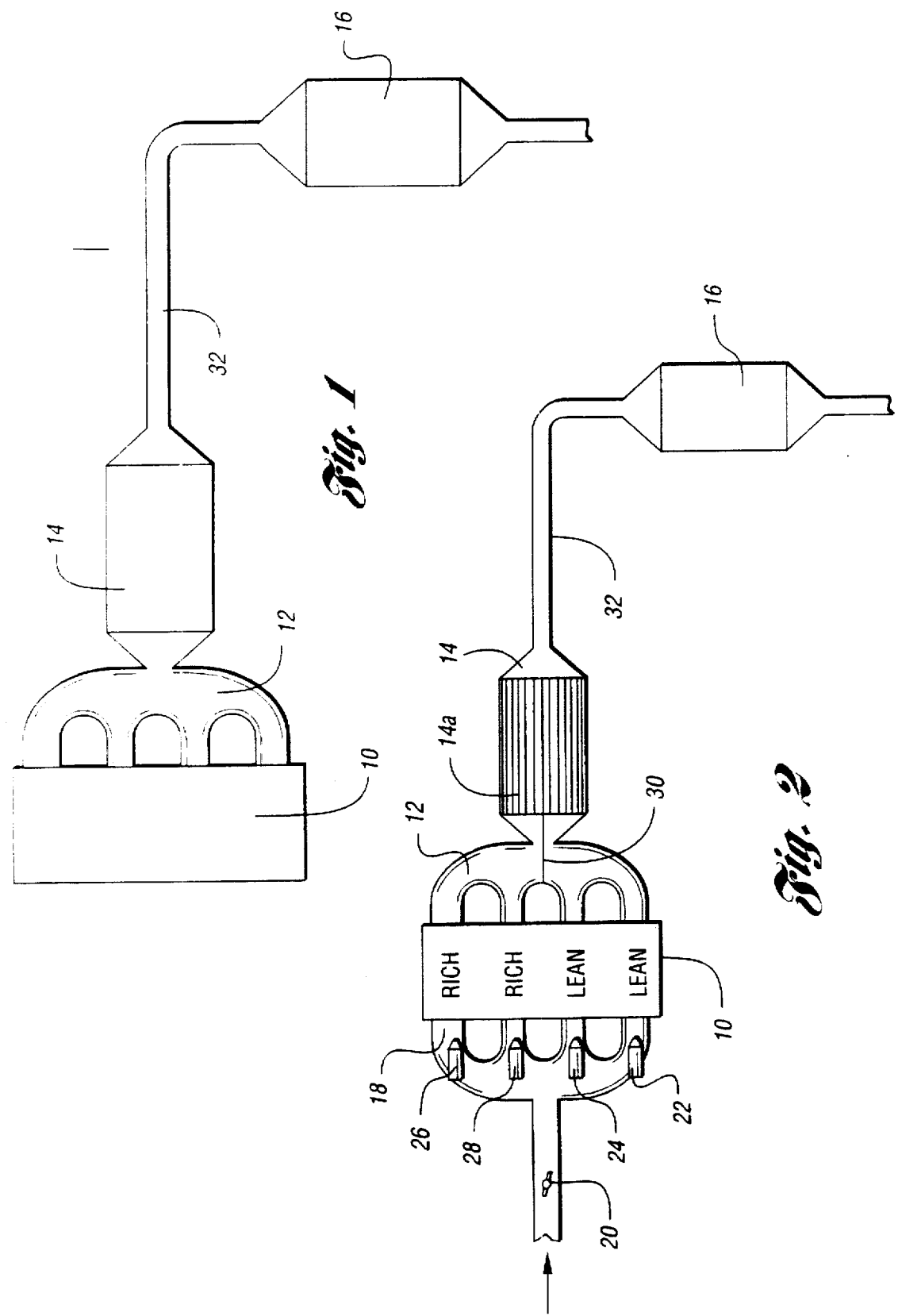

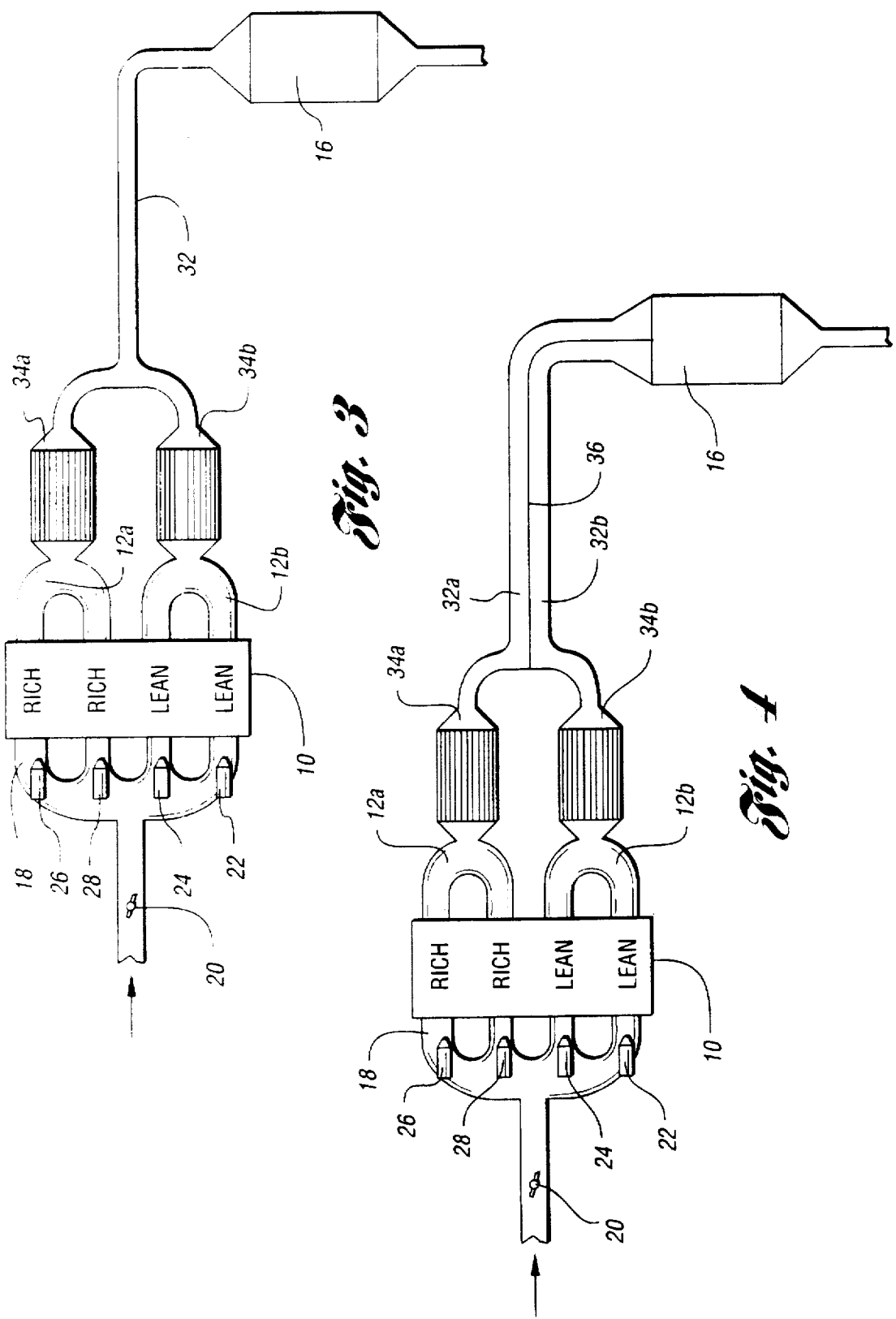

5,758,493

METHOD AND APPARATUS FOR DESULFATING A $NO_x$ TRAP

TECHNICAL FIELD

This invention relates to exhaust after-treatment and, more particularly, to a method and apparatus for removing sulfur accumulated in a $NO_x$ trap.

BACKGROUND ART

Lean burn engines usually operate at an air/fuel ratio (A/F)$\geq$18 to obtain improved fuel economy. However, the usual three-way catalyst (TWC) is ineffective unless operated at approximately stoichiometry, (A/F=14.65). Accordingly, it has been proposed to locate a $NO_x$ trap downstream of the TWC to store $NO_x$ during lean A/F operation and subsequently converting the $NO_x$ to $N_2$ and $O_2$ by operating the engine at a rich A/F. This $NO_x$ conversion occurs within an optimum temperature window of approximately 300° C. to 400° C. The trap is preferably located underbody so that during hard, wide-open throttle (WOT) driving, the trap temperature does not exceed 800° C. The temperature of the three-way catalyst should not exceed approximately 1000° C.

When operating with fuel containing sulfur, an accumulation of sulfur in the trap causes a decrease in $NO_x$ conversion efficiency. The sulfur must be "burned" off or desorbed at temperatures $\geq$675° C. and with an A/F$\leq$14.65 (rich). A method is needed for raising the temperature of the trap from its usual operating temperature of approximately 300° to 400° C. to a temperature of at least 675° C., without secondary air injection due to the expense involved in that approach.

Accordingly, it is an object of the present invention to provide a method and apparatus for raising the temperature of a $NO_x$ trap to at least 675° C. without using a secondary air pump and without damaging a closely coupled three-way catalyst through excessive temperature (>1000° C.).

SUMMARY OF THE INVENTION

In accordance with the present invention, a $NO_x$ trap is desorbed or desulfated by generating an exothermic temperature in the trap by combining separate rich and lean exhaust gases produced by the engine. A conventional three-way catalyst is situated between the exhaust ports of the engine and the trap. Half of the engine cylinders are operated at a rich (A/F) and half are operated at a lean A/F. The two exhaust gas streams, the rich stream and the lean stream are kept physically or chemically separated at least until they emerge from the three-way catalyst and are combined as they enter the $NO_x$ trap. Chemical separation relies on use of a single exhaust pipe and on keeping the temperature of the gaseous mixture of HC, CO, and $O_2$ well below the gas phase reaction temperature of 700° C. A catalyzed exothermic chemical reaction is then generated in the trap. This results in the achievement of the desired temperatures in the trap to accomplish $SO_x$ removal from the trap. A control scheme is provided for adjusting the spark advance for both the lean and rich cylinders during desulfation to minimize induced RPM variations. Minimal RPM variation will occur with a small imbalance in integrated torque and integrated mean effective pressure due to the effect of spark timing on the pressure curves.

BRIEF DESCRIPTION OF THE DRAWINGS

A more complete understanding of the present invention may be had from the following detailed description which should be read in conjunction with the drawings in which:

FIG. 1 shows the conventional configuration of an engine, exhaust manifold, exhaust pipe, three-way catalyst and trap;

FIG. 2 shows one embodiment of the invention wherein two exhaust streams of a single close coupled three-way catalyst are separated by means of a divider plate in the exhaust manifold;

FIG. 3 shows a second embodiment of the invention using two separate exhaust manifolds and two separate associated close coupled three-way catalysts;

FIG. 4 shows a third embodiment of the invention using two separate exhaust manifolds and two separate associated close coupled three-way catalysts and a divided exhaust;

DETAILED DESCRIPTION OF THE PREFERRED EMBODIMENT

Figure 5:
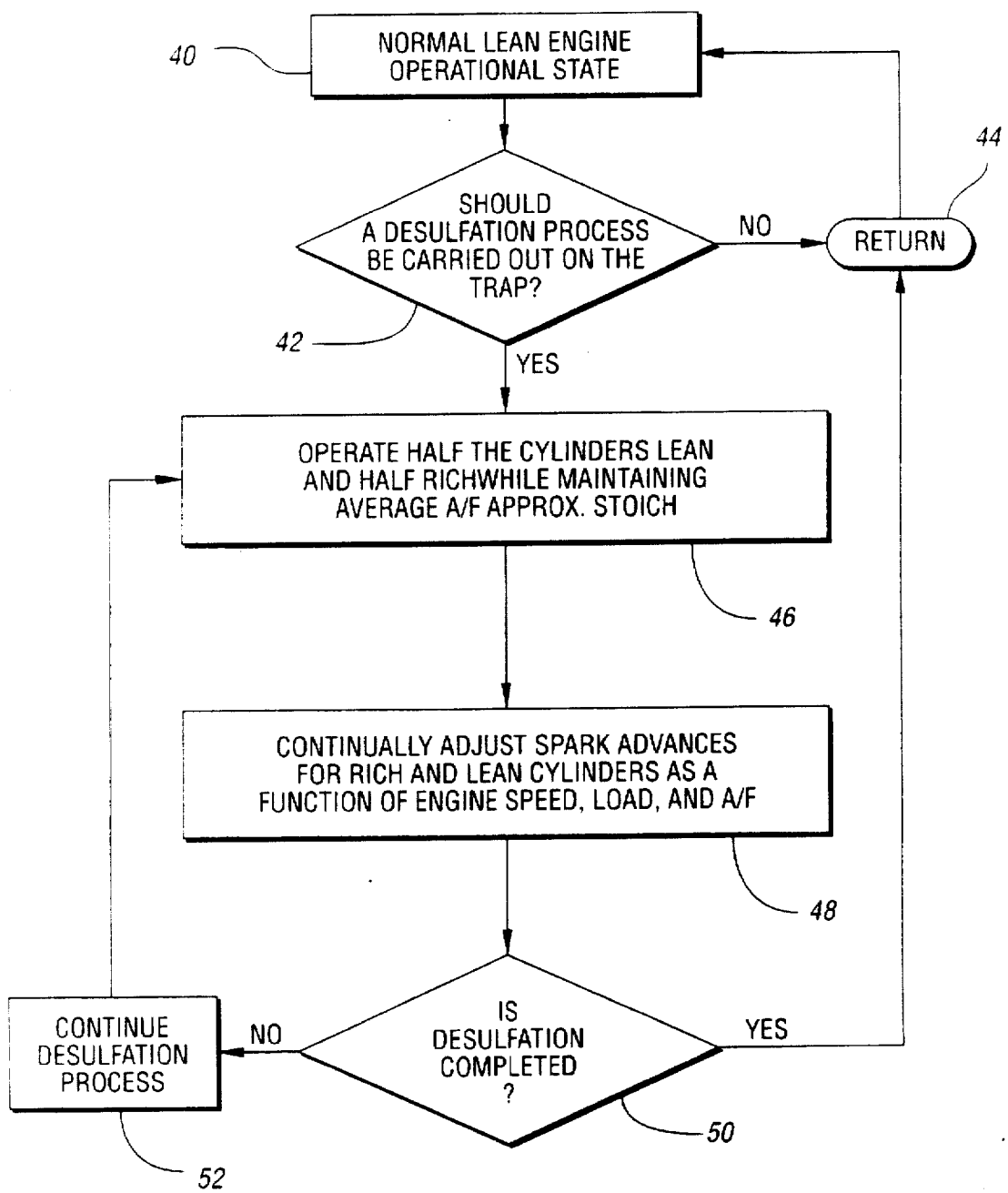
FIG. 5 is a flowchart for cylinder event time matching during the desulfation process.

Referring now to the drawings and initially to FIG. 1, a conventional lean burn engine and exhaust configuration is shown to include an engine 10, exhaust manifold 12, a close coupled monolithic three-way catalytic converter 14, approximately 1 meter of exhaust pipe 32 and an underbody $NO_x$ trap 16.

FIG. 2 shows a first embodiment of the invention where the engine cylinders are divided into two groups, both of which receive air from an intake manifold 18 under control of a throttle 20. The first group is operated at a lean A/F (A/F>14.65 for gasoline) from fuel injectors 22 and 24 and the second group is operated at a rich A/F ratio (A/F<14.65 for gasoline) from fuel injectors 26 and 28. An engine fuel controller (not shown) controls the fuel injections in accordance with a control algorithm to achieve the desired A/F. The rich cylinders produce exhaust that has high concentrations of unburned HC and CO while the lean cylinders produce exhaust flow that has a high concentration of $O_2$. A divider plate 30 maintains two separate exhaust streams through the exhaust manifold 12 and through the three-way catalyst 14. The catalyst 14 has extrusion holes indicated at 14a. Other exhaust stream separation means may be used. The rich and lean exhaust streams are allowed to merge in the exhaust passage 32 before entering the trap 16. There is no chemical reaction exotherm in the exhaust pipe 32, where both the rich and lean exhaust stream mix, due to insufficient temperature (i.e. temperature<700° C.) The catalytic activity of the trap promotes an exothermic chemical reaction, resulting in catalyzed combustion, the generation of heat, and the increase of temperature within the trap. This causes the temperature of the trap to increase to approximately 675° C., where a desulfation operation can be carried out on the trap.

FIG. 3 shows a second embodiment of the invention using two separate exhaust manifolds 12a and 12b, and two separate associated close coupled three-way catalysts 34a and 34b. The separate rich and lean exhaust streams are combined physically in the exhaust passage 32, but will not chemically react appreciably until entry into the $NO_x$ trap 16, where catalytic activity occurs.

In FIG. 4, another embodiment is shown to include a divided exhaust passage 30 that replaces the undivided exhaust passage shown in FIG. 2. The passages 32a and 32b are separated by a divider 36 so that the rich exhaust stream is confined to the exhaust passage 32a and the lean exhaust stream is confined to the exhaust passage 32b, before being combined in the NO$_x$ trap. The use of a divided exhaust pipe between the three-way catalysts and the trap ensures that the rich and lean exhaust streams are physically separated before they reach the lean NO$_x$ trap to insure that little or no exothermic chemical reaction occurs prior to the lean NO$_x$ trap. Different engines and operating points have different pumping and separation requirements. Therefore, different exhaust separation configuration are desirable due to the pumping action of exhaust blowdowns sucking mixed gases back into the three-way catalyst.

Although the designs shown in FIGS. 1–4 are illustrated with a I4 engine, the invention is applicable to engines of any number of cylinders, such as 2, 6, 8, 10, 12.

During the desulfation process, half the cylinders are operated at rich A/F and half are operated at lean A/F. This will result in a significant event time differences between the rich cylinders and the lean cylinders if the spark advances for all cylinders are set at MBT (minimum spark advance for best torque). The rich cylinders can exhibit as much as 30% or more torque than the lean cylinders resulting in a torque imbalance. To minimize torque imbalance, spark advance for the rich cylinders is retarded, while maintaining MBT spark for the lean cylinders. The rich spark advance is retarded as required, as a function of engine speed, load, and A/F such as to match as closely as possible the event times of the lean cylinders. This rich cylinder spark retard condition is entered only when it is necessary to desulfate the lean NO$_x$ trap. The retard condition is maintained during the desulfation operation. It is terminated when the control system exits to normal operation with the lean NO$_x$ trap.

This spark control method is shown in the flowchart of FIG. 5, where the block 40 indicates the normal lean operational state of the engine. At decision block 42, a determination is made whether a desulfation of the NO$_x$ trap is needed. The criteria for making this decision forms no part of this invention. Various methods are proposed in the prior art. If desulfation is not required, the routine returns at 44 to normal lean operation. If desulfation is required, half of the cylinders are operated lean and the other half are operated rich, while maintaining an average A/F ratio at approximately stoichiometric as indicated at block 46. During the desulfation, the spark advance for the cylinder operating with a rich A/F is retarded, while MBT spark is maintained for the lean cylinders, as indicated in block 48. Both spark advances are adjusted as a function of engine speed, load, and A/F via calibration look-up tables. For example, the A/F for the rich and lean cylinders may be adjusted for engine speed and load to vary the A/F span or difference between the rich and lean A/F while maintaining an average A/F at approximately stoichiometric. The rich and lean A/F would then be an input, along with engine speed and load, to respective spark advance tables for the rich and lean cylinders. If desulfation of the trap is complete, as determined at block 50, the routine returns to normal lean operation, otherwise the desulfation process is continued, as indicated at block 52.

Figure 6:
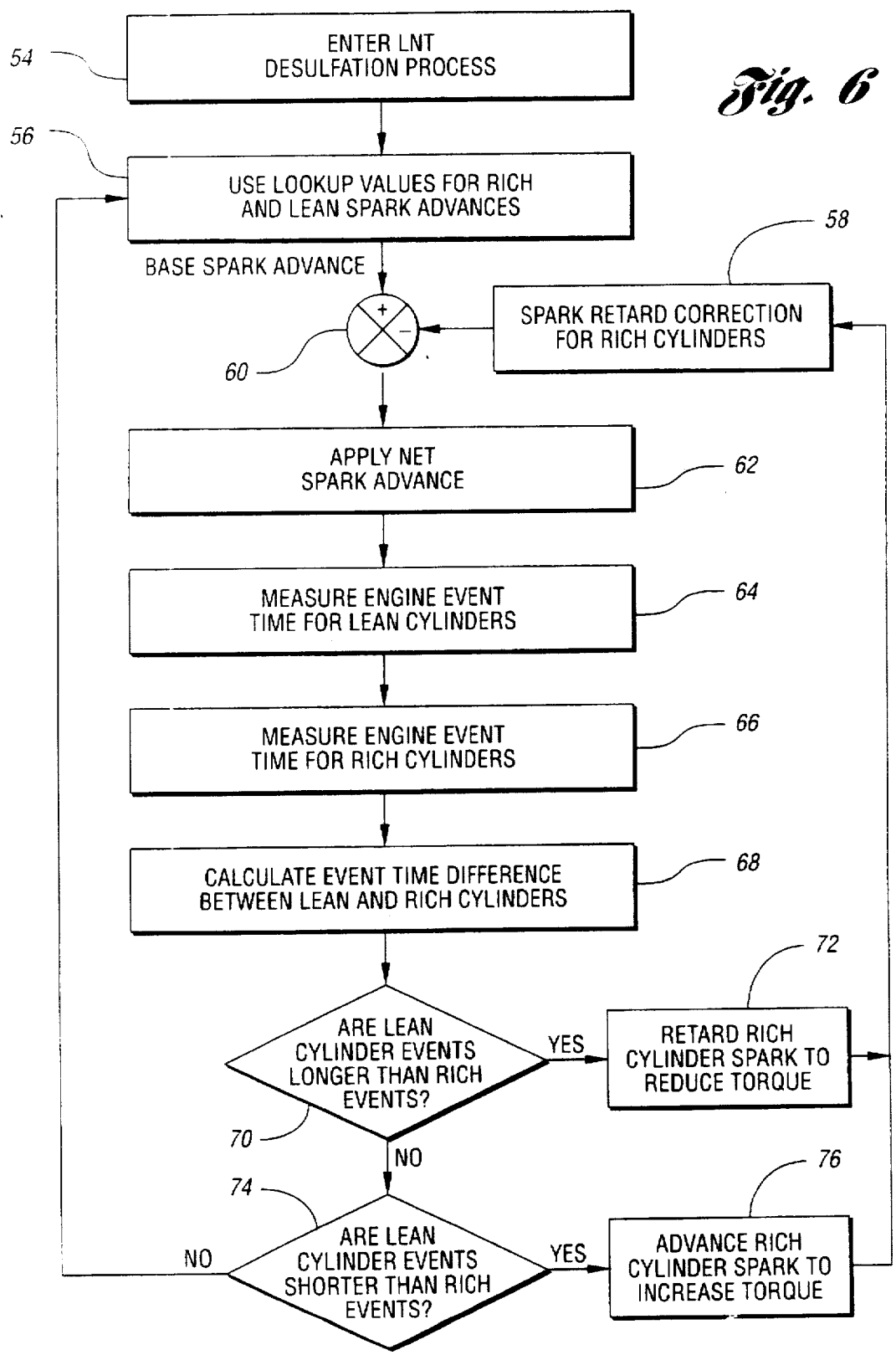
FIG. 6 is a flowchart of adding a feedback correction to the open loop spark advance calculated in FIG. 5.

To improve accuracy of control, a feedback control system is applied, as shown in FIG. 6. The basic open loop or scheduled spark advances are calculated as in FIG. 5, and are indicated by the blocks 54 and 56. A feedback correction to the basic spark is applied at block 58 based on measurement of the difference in time between a rich and a lean cylinder event (180 degrees of crankshaft rotation during a power stroke). The correction is made to the base spark advance at 60 and the corrected spark advance is applied at 62. If the RPM or periods for rich and lean cylinders are matched, there will be no substantial difference in event times. The engine event time for lean cylinders and rich cylinders is measured at blocks 64 and 66 respectively and the difference is calculated at 68. If the rich cylinders have excessive spark retard, the events of the rich cylinders will be longer than those of the lean cylinders and spark retard should be decreased. Accordingly, at block 70, the difference or error is checked. If lean cylinder events are longer than rich cylinder events, a rich cylinder spark retard correction is calculated at block 72 proportional to the magnitude of the difference. On the other hand, if the events of the rich cylinders are shorter than those of the lean cylinders, as determined at block 74, the spark retard for the rich cylinders is insufficient and should be increased. The appropriate spark retard correction is calculated at block 76. It will be understood control is not limited to proportional control only but may include integral and derivative control if desired.

While the best mode for carrying out the present invention has been described in detail, those familiar with the art to which this invention relates will recognize various alternative designs and embodiments for practicing the invention as defined by the following claims.

What is claimed is:

1. A method of desulfating a NO$_x$ trap located in the exhaust passage of an engine having at least a first and a second cylinder comprising the steps of:

providing a lean fuel mixture to said first cylinder and a rich fuel mixture to said second cylinder;

maintaining separate oaths for the exhaust gases from said first and second cylinders until entry into said trap to produce an exothermic reaction in said trap;

maintaining an average air/fuel ratio to said engine of approximately stoichiometric;

adjusting spark advance for said rich and lean cylinders to minimize event time imbalance, wherein the spark advance adjustments are a function of engine speed, load and air/fuel ratio; and retarding the spark of said rich cylinder if the lean cylinder event is of longer time duration than the rich cylinder event.

2. The method defined in claim 1 including the further step of advancing the spark of said rich cylinder if the lean cylinder event is of shorter time duration than the rich cylinder event.

3. Apparatus for desulfating a NO$_x$ trap located in the exhaust passage of a multi-cylinder engine having exhaust manifold means connected with catalytic converter means located in said exhaust passage upstream of said NO$_x$ trap, said apparatus comprising:

means providing a lean fuel mixture to one half of the cylinders of said engine and providing a rich fuel mixture to the other half of the cylinders of said engine;

means for combining the exhaust gases from all lean burn cylinders and all rich burn cylinders no later than upon entry of the exhaust gases into said trap to thereby produce an exothermic reaction in said trap.

4. The apparatus of claim 3 further including a divider plate in the exhaust manifold means for establishing separate paths for the exhaust gases from all lean burn cylinders and all rich burn cylinders.

5. The apparatus of claim 3 wherein said exhaust manifold means includes two separate exhaust manifolds and said catalytic converter means includes two separate three-way catalysts to provide separate rich and lean exhaust streams.

6. The apparatus of claim 5 wherein the output exhaust streams of the two catalysts are fed to said NO$_x$ trap through an exhaust pipe.

7. The apparatus of claim 6 wherein said exhaust pipe includes a divider providing separate passages in said exhaust pipe for the rich exhaust stream and the lean exhaust stream to insure that little or no exothermic chemical reaction occurs prior to the $NO_x$ trap.

8. The apparatus of claim 3 further including means for adjusting spark advance for said rich burn cylinders and said lean burn cylinders to minimize event time imbalance.

9. The apparatus of claim 8 wherein said means for adjusting spark advance retards the spark of said rich burn cylinders if a lean burn cylinder event is of longer time duration than a rich cylinder event and advances the spark of said rich burn cylinders if a lean burn cylinder event is of shorter time duration than a rich cylinder event.

10. A method of desulfating a $NO_x$ trap located in the exhaust passage of an engine having at least a first and a second cylinder comprising the steps of:

provicing a lean fuel mixture to said first cylinder and a rich fuel mixture to said second cylinder;

combining the exhaust gases from said first and second cylinders to produce an exothermic reaction in said traps;

maintaining an average air/fuel ratio to said engine of approximately stoichiometric;

adjusting spark advance for said rich and lean cylinders to minimize event time imbalance; and retarding the spark of said rich cylinder if the lean cylinder event is of longer time duration than the rich cylinder event, and advancing the spark of said rich cylinder if the lean cylinder event is of shorter time duration than the rich cylinder event.

11. An article of manufacture comprising:

a computer storage medium having a computer program encoded therein for causing the computer to control an engine having at least two cylinders, said computer storage medium comprising:

code for causing the computer to direct fuel to a first half of the cylinders of said engine to establish a lean air/fuel mixture ratio, and to direct fuel to a second half of the cylinders of said engine to establish a lean air/fuel mixture ratio;

code for causing the computer to control spark advance;

code for causing the computer to measure cylinder events;

code for causing the computer to maintain an average air/fuel ratio to said engine of approximately stoichiometric; and code for causing the computer to adjust spark advance for said rich and lean cylinders to minimize event time imbalance including instructions for accessing vehicle operating condition and instructions for retarding the spark of one half of said cylinders if the cylinder event of the other half of said cylinders is of longer time duration than the cylinder event of said one half of said cylinders, and for advancing the spark of said one half of said cylinders if the cylinder event of the other half of said cylinders is of shorter time duration than the cylinder event of said one half of said cylinders.

12. A method of desulfating a $NO_x$ trap, located in the exhaust passage of a multi-cylinder engine comprising a sequence of the following steps:

providing a lean fuel mixture to one half of the cylinders of said engine;

providing a rich fuel mixture to the other half of the cylinders of said engine;

combining the exhaust gases from all lean burn cylinders and all rich burn cylinders no later than upon entry of the exhaust gases into said trap; and producing an exothermic reaction in said trap wherein said $NO_x$ trap is located downstream of catalytic converter means that maintain separation of the exhaust gases from said lean burn cylinders and said rich burn cylinders, and wherein said gases are combined prior to entry into said trap.

13. The method defined in claim 12 wherein said converter means includes a single catalytic converter including means for maintaining separation of said gases during passage through said single converter, said converter means further including an exhaust pipe for combining said gases and feeding the combined gases to said trap.

14. The method defined in claim 12 wherein said converter means includes a first and second catalytic converters for receiving exhaust gases from said lean burn and rich burn cylinders respectively, said converter means further including an exhaust pipe for combining the gases exiting from said first and second catalytic converters and feeding the combined gases to said trap.

15. The method defined in claim 12 wherein said converter means includes a first and second catalytic converters for receiving exhaust gases from said lean burn and rich burn cylinders respectively, said converter means further including exhaust pipe means for maintaining separation of said gases exiting from said first and second catalytic converters until combining said gases upon entry into said trap.

16. A method of desulfating a $NO_x$ trap located in the exhaust passage of an engine downstream from catalytic converter means, said engine having at least a first and a second cylinder comprising the steps of:

providing a lean fuel mixture to said first cylinder and a rich fuel mixture to said second cylinder; and maintaining separate paths for the exhaust gases from said first and second cylinders through said converter means until entry into said trap to produce an exothermic reaction in said trap.

* * * * *